US011950598B2

(12) United States Patent
Carlson

(10) Patent No.: US 11,950,598 B2
(45) Date of Patent: *Apr. 9, 2024

(54) MATERIAL FOR ENHANCING ATTRIBUTES OF A TOPICAL OR SURFACE TREATMENT COMPOSITION

(71) Applicant: Tygrus, LLC, Troy, MI (US)

(72) Inventor: Lawrence Carlson, Oxford, MI (US)

(73) Assignee: Tygrus, LLC, Troy, MI (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/334,979

(22) Filed: May 31, 2021

(65) Prior Publication Data

US 2021/0289789 A1    Sep. 23, 2021

Related U.S. Application Data

(63) Continuation of application No. 17/068,052, filed on Oct. 12, 2020, which is a continuation of application No. 15/202,130, filed on Jul. 5, 2016, now Pat. No. 10,798,945.

(60) Provisional application No. 62/188,615, filed on Jul. 3, 2015.

(51) Int. Cl.
*A01N 59/02*    (2006.01)
*A01N 59/00*    (2006.01)

(52) U.S. Cl.
CPC ............. *A01N 59/02* (2013.01); *A01N 59/00* (2013.01)

(58) Field of Classification Search
CPC .................................................... A01N 59/02
See application file for complete search history.

(56) References Cited

U.S. PATENT DOCUMENTS

| | | |
|---|---|---|
| 5,380,430 A | 1/1995 | Overton et al. |
| 5,571,336 A | 11/1996 | Wurzburger et al. |
| 5,575,974 A | 11/1996 | Wurzburger et al. |
| 5,698,107 A | 12/1997 | Wurzburger et al. |
| 5,756,051 A | 5/1998 | Overton et al. |
| 5,830,838 A | 11/1998 | Wurzburger et al. |
| 5,891,320 A | 4/1999 | Wurzburger et al. |
| 5,895,782 A | 4/1999 | Overton et al. |
| 6,096,222 A | 8/2000 | Wurzburger et al. |
| 6,197,816 B1 | 3/2001 | Vincent et al. |
| 6,444,231 B2 | 9/2002 | Vincent et al. |
| 7,354,953 B2 | 4/2008 | Vincent |
| 7,513,987 B1 | 4/2009 | Wurzbarger |
| 2001/0019728 A1 | 9/2001 | Basinger et al. |
| 2009/0304608 A1 | 12/2009 | Cueman et al. |
| 2016/0045460 A1 | 2/2016 | Weaver et al. |
| 2016/0312093 A1 | 10/2016 | Carlson et al. |
| 2017/0000114 A1 | 1/2017 | Carlson |
| 2017/0281484 A1 | 10/2017 | Carlson |
| 2017/0368556 A1 | 12/2017 | Carlson |

FOREIGN PATENT DOCUMENTS

| | | |
|---|---|---|
| CN | 102747371 A | 10/2012 |
| EP | 2086529 B1 | 4/2015 |
| RU | 2091321 C1 | 9/1997 |
| RU | 2142930 C1 | 12/1999 |
| RU | 2174959 C1 | 10/2001 |
| RU | 2284966 C2 | 10/2006 |
| RU | 2476804 C2 | 2/2013 |
| WO | 1998/05595 A1 | 2/1998 |
| WO | 0134754 A1 | 5/2001 |
| WO | 2005113735 A1 | 12/2005 |

OTHER PUBLICATIONS

Chang-Geng Ding, et al., "Partially and Fully Deprotonated Sulfuric Acid", Chemical Physics Letters, vol. 390, No. 4-6, Apr. 30, 2004, pp. 307-313.
Orkid Coskuner, et al. "Water Dissociation in the Presence of Metal Ions" Angewandte Chemie, vol. 119, No. 41, Oct. 15, 2007, pp. 7999-8001.
Steposol DG, Stepan, Proprietary Cationic/Nonionic Blend, retrieved from the Internet, dated Apr. 1, 2009, @BULLET Highway Structures, 2 pages.
Stepan Company, Safety Data Sheet, "STEPSOL DG", retrieved from the internet, dated Jan. 1, 2014, 8 pages.
International Preliminary Report on Patentability, for international application No. PCT/US2017/039241, dated Jan. 3, 2019, 6 pages.
International Search Report and Written Opinion for international application No. PCT/US2017/039241; dated Oct. 5, 2017; ISA/RU; 7 pages.
International Search Report in corresponding application PCT/US2017/025495, dated Oct. 11, 2018.
Supplementary European Search Report, EP16784073, dated Dec. 20, 2018, 5 pages.
Supplementary European Search Report for EP 16821874, dated Dec. 20, 2018, 8 pages.

*Primary Examiner* — Benjamin J Packard
(74) *Attorney, Agent, or Firm* — Young Basile Hanlon & MacFarlane, P.C.

(57) ABSTRACT

A composition comprising:
at least one compound of the chemical structure:

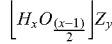

wherein x is an odd integer ≥3;
y is an integer between 1 and 20; and
Z is one of a monoatomic ion from Groups 14 through 17 having a charge value between −1 and −3 or a polyatomic ion having a charge between −1 and −3; or

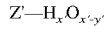

wherein x' is an integer greater than 3
y' is an integer less than x'; and
Z' is one of a monoatomic cation, a polyatomic ion or a cationic complex; and
at least one of a humectant emollient or carrier.

20 Claims, No Drawings

MATERIAL FOR ENHANCING ATTRIBUTES OF A TOPICAL OR SURFACE TREATMENT COMPOSITION

The present application is a continuation of U.S. Non-provisional patent application Ser. No. 17/068,052 filed Oct. 12, 2020, currently pending which is a continuation of U.S. Non-provisional patent application Ser. No. 15/202,130 filed on Jul. 5, 2016 issued Oct. 13, 2020 which is a non-provisional application based on U.S. Provisional Application Ser. No. 62/188,615 filed Jul. 3, 2015, the specification of all are incorporated herein by reference.

BACKGROUND

The present invention relates to compositions that can be incorporated into various topical or surface treatment compositions to enhance or more attributes for example antimicrobial or preservative action.

It has been long accepted scientific fact that, based upon laws of thermodynamics, the internal energy of a closed system is stable when the two different charge-types, i.e. moles of positively charged cations (+) and moles of negatively charged anions (−), are stoichiometrically charge-balanced; yielding a stable charge neutral aqueous solution. It has been widely held that electrostatic charge types in a neutral solution will necessarily have positive electrostatic charges (+) balanced by an equal number of negative (−) electrostatic charges. However, studies conducted on aqueous acidic solutions indicate that various solutions may process and excess of acid proton ions.

This phenomenon supports the conclusion that water molecules are effective in stabilizing unbalanced charges present in solution. It is believed that water molecules present in an aqueous solution stabilize any unbalanced charges and to yield a charge balanced solution. The results conform to the laws of thermodynamics and point to the presence of a new type of charge balancing nucleophile composed of lone pair electrons of water molecules.

The resulting compound can be integrated into various topical or surface treatment composition to enhance antimicrobial and/or preservative attributes of the composition.

SUMMARY

Disclosed herein is a method topically treating a target external surface region on a biological life comprising the steps of:
contacting the external surface target region of the biological life form at least one plant surface with a composition comprising:
A. an active agent component, the active component comprising one or more compounds, the at least one or more compounds have at least one of the following structures:

$$\left[H_x O_{\frac{(x-1)}{2}}\right] Z_y \quad \text{I}$$

wherein x is an odd integer $\geq 3$;
y is an integer between 1 and 20; and
Z is a polyatomic ion;

$$H_x Y_{x-y}{-} \quad \text{II}$$

where x is an integer greater than 3; and
wherein y is an integer less than x;
wherein the charge value associated with the molecular component is at least −1;
B. at least one surface active agent; and
C. water.
permitting at least a portion of the composition to remain in contact with the plant surface for an interval of at least 10 seconds; and
removing at least the aqueous portion of the composition from the plant surface, wherein the contacting step results in at least one of treating and reducing fungal and/or parasitic growth on the surface of the biological life form, increasing positive surface characteristics of the biological life form.

In certain embodiments, the biological life form is a growing plant and the target region is one or more leaf surfaces.

Also disclosed herein is a topical or surface treatment composition suitable for application on at least one target surface region of a biological life form use on vegetation, the composition comprising:

An active agent component, the active component having one or more compounds selected from the group consisting of:

$$\left[H_x O_{\frac{(x-1)}{2}} + (H_2 O)_y\right] Z$$

wherein x is an odd integer $\geq 3$,
y is an integer between 1 and 20, and
Z is a polyatomic ion, $$H_x Y_{x-y}{-}$$

where x is an integer greater than 3, and
wherein y is an integer less than x,
wherein the charge value associated with the molecular component is at least −1;
at least one surfactant compound; and
water.

DETAILED DESCRIPTION

Disclosed herein is composition is a composition for use on at least one target region of a biological life form that has demonstrated efficacy for reducing fungal and/or parasitic growth on vegetation, particularly plant foliage. The composition disclosed herein also can enhance disease resistance and treated plants and can, in certain situations, can enhance plant vigor and soil conditions proximate to the growing plant. Also disclosed is a method and process for promoting plant growth and vigor that includes application of an aqueous solution containing the material as disclosed herein to at least one region of the growing plant, allowing the applied aqueous solution to reside on the application region for an interval and removing a portion of the applied aqueous solution from the application region after a predetermined interval.

The composition disclosed comprises an effective amount of at least one stable oxonium ion compound that is present in an aqueous solution in combination with at least one surface modifying agent. In certain applications and embodiments, the stable oxonium ion compound will be present at a concentration between 0.01 wt. % and 60 wt. %, with concentrations between 0.5 wt. % and 50 wt. % being employed in certain instances. The composition also comprises an effective amount of at least one surface modifying agent, with concentrations between 0.001 wt. % and 1 wt. % being employed in certain embodiments.

It has been unexpectedly discovered that aqueous solutions that include a novel compound that can broadly be classified as an electrolyte that can be broadly construed as a stable oxonium ion compound and can be employed in various routine and non-routine agricultural processes to address infestation with various molds, spores, fungus and the like. It has also been found, quite unexpectedly that aqueous compositions containing the compound as disclosed herein can be employed as a topically applied material that can increase plant vigor and resistance to disease and environmental stress.

As defined herein "oxonium ion compound" are generally defined as positive oxygen cations having at least one trivalent oxygen bond. In certain embodiments the oxygen cation will exist in aqueous solution as a population predominantly composed of one, two and three trivalently bonded oxygen cations present as a mixture of the aforesaid cations or as material having only one, two or three trivalently bonded oxygen cations. Non-limiting examples of oxonium ions having trivalent oxygen cations can include at least one of stable hydronium ions, alkaline derivatives of stable hydronium ions and the like.

It is contemplated that the in certain embodiments the oxygen cation will exist in aqueous solution as a population predominantly composed of one, two and three trivalently bonded oxygen anions present as a mixture of the aforesaid anions or as material having only one, two or three trivalently bonded oxygen anions.

When the compound as disclosed herein can be admixed with an aqueous or polar solvent, the resulting composition is as solution can be composed of stable hydronium ions and/or hydronium ion complexes. Suitable cationic analogues of these materials such as hydroxonium ion complexes are also considered within the definition of stable oxonium compounds as contemplated herein. The stable oxonium compounds and compositions disclosed herein that contain the same may have utility in various applications where controlled pH and/or antimicrobial/bactericidal/antifungal characteristics are desirable. Non-limiting examples of such compositions include topical compositions that can be applied to one or more surface regions of a growing plant and as well as topical application to human skin as a part of cosmetic compositions, that can include but need not be limited to moisturizers, body washes, clarifiers and the like. It is also contemplated that aqueous compositions containing one or more of the compounds disclosed herein can be employed as rinse materials for hair, skin, regions of skin irritation or trauma and the like.

It has been theorized that extreme trace amounts of cationic hydronium may spontaneously form in water from water molecules in the presence of hydrogen ions. Without being bound to any theory, it is believed that naturally occurring stable hydronium ions are extremely rare, if they occur at all. The concentration of naturally occurring hydronium ions in water is estimated to be no more than 1 in 480,000,000. It is also theorized that naturally occurring hydronium ions are unstable transient species with lifespans typically in the range of nanoseconds. Naturally occurring hydronium ions are reactive and are readily solvated by water and as such these hydronium ions (hydrons) do not exist in a free state.

The present invention is predicated on the unexpected discovery that the stable hydronium ion compounds as well as the base analog of such stable hydronium ions can be synthesized. When one or more of these materials are introduced into a solvent the compounds remain stable and produce compositions having acid (or basic) functionalities and characteristics without the harshness of conventional acid or base materials When introduced into pure water, the stable hydronium material disclosed herein will complex with water molecules to form hydration cages of various geometries, non-limiting examples of which will be described in greater detail subsequently. The stable electrolyte material as disclosed herein, when introduced into aqueous solution in which the hydronium compound is stable and can be isolated from the associated water by processes that will be described in detail subsequently. Similarly, the base counterparts to hydronium compounds when introduced into aqueous material will form base functioning complexes with suitable molecules present in the aqueous solution to form hydroxy complexes.

Strong organic and inorganic acids such as those having a $pK_a \geq 1.74$, when added to water, will ionize completely in the aqueous solution. The ions so generated will protonate existing water molecules to form $H_3O+$ and associated stable clusters. Weaker acids, such as those having a $pK_a < 1.74$, when added to water, will achieve less than complete ionization in aqueous solution but can have utility in certain applications. Thus, it is contemplated that the acid material employed to produce the stable electrolyte material can be a combination of one or more acids. In certain embodiments, the acid material will include at least one acid having a $pK_a$ greater than or equal to 1.74 in combination with weaker acids(s).

In the present disclosure, it has been found quite unexpectedly that the stable hydronium electrolyte material as defined herein, when added to an aqueous solution, will produce a polar solvent and provide and effective $pK_a$ which is dependent on the amount of stable hydronium material added to the corresponding solution independent of the hydrogen ion concentration originally present in that solution. The resulting solution can function as a polar solvent and can have an effective $pK_a$ between 0 and 5 in certain applications when the initial solution pH prior to addition of the stable hydronium material is between 6 and 8.

It is also contemplated that the stable hydronium material as disclosed herein can be added to solutions having an initial pH in the more alkaline range, for example between 8 and 12 to effectively adjust the pH of the resulting solvent and/or the effective or actual $pK_a$ of the resulting solution. Addition of the stable electrolyte material as disclosed herein can be added to the alkaline solution without measurable reactive properties including but not limited to exothermicity oxidation or the like.

The acidity of theoretical hydronium ions existing in water as a result of aqueous auto-dissociation is the implicit standard used to judge the strength of an acid in water. Strong acids are considered better proton donors than the theoretical hydronium ion material otherwise a significant portion of acid would exist in a non-ionized state. As indicated previously, theoretical hydronium ions derived from aqueous auto-dissociation are unstable as a species, random in occurrence and believed to exist, if at all in extreme low concentration in the associated aqueous solution. Generally, hydronium ions in aqueous solution are present in concentrations between less than 1 in 480,000,000 and can be isolated, if at all, from native aqueous solution via solid or liquid phase organosynthesis as monomers attached to a superacid solution in structures such as $HF—SbF_5SO_2$. Such materials can be isolated only in extremely low concentration and decompose readily upon isolation.

In contrast, the stable hydronium material as disclosed and employed herein, provides a source of concentrated hydronium ions that are long lasting and can be subsequently isolated from solution if desired or required.

In certain embodiments, the composition of matter, when present in polar solution can have the following chemical structure:

$$\left[H_xO_{\frac{(x-1)}{2}} + (H_2O)_y\right]Z$$

wherein x is an odd integer between 3-11;
y is an integer between 1 and 10; and
Z is a polyatomic or monoatomic ion The polyatomic ion can be derived from an ion derived from an acid having the ability to donate on or more protons. The associated acid can be one that would have a $pK_a$ values ≥1.7 at 23° C. The ion employed can be one having a charge of +2 or greater. Non-limiting examples of such ions include sulfate, carbonate, phosphate, oxalate, chromate, dichromate, pyrophosphate and mixtures thereof. In certain embodiments, it is contemplated that the polyatomic ion can be derived from mixtures that include polyatomic ion mixtures that include ions derived from acids having $pK_a$ values ≤1.7.

The stable electrolyte hydronium material as disclosed herein is stable at standard temperature and pressure and can exist as an oily liquid. The electrolyte hydronium material can be added to water or other polar solvent to produce a polar solution that contains an effective concentration of stable hydronium ion that is greater than 1 part per million. Similarly, the stable base analogue of hydronium material that is disclosed and employed herein can be introduced into water or other polar solvent at a concentration that will provide an effective concentration of stable base analog of the hydronium ion at a concentration greater than 1 part per million.

It has been found, quite unexpectedly, that the hydronium ions that are derived from the addition of the stable electrolyte material disclosed herein alter the acid functionality of the resulting solvent without the concomitant alteration of the free to total acid ratio. The alteration in acid functionality can include characteristic such as change in measured pH, changes in free-to-total acid ratio, changes specific gravity change and rheology. Changes in spectral and chromatography output are also noted as compared to the incumbent acid materials used in production of the stable electrolyte material containing the initial hydronium ion complex. A portion of the chemical composition can be present $H_9O_4+$ in coordinated combination with $H_9O_4+:SO_4H$ and working bridging ligands containing stable hydronium ($H_3O+$) clusters. Addition of to stable hydronium ion material as disclosed herein results in changes in $pK_a$ which do not correlate to the changes observed in free-to-total acid ratio.

Thus, by way of non-limiting illustrative example, the addition of the stable hydronium electrolyte material as disclosed herein to an aqueous solution having a pH between 6 and 8 results in a solution having an effective $pK_a$ between 0 to 5. It is also to be understood that $K_a$ of the resulting solution can exhibit a measured value less than zero as when measured by a calomel electrode, specific ion ORP probe depending on the concentration of stable hydronium ion present in the solution. As used herein the term "effective $pK_a$" is defined as a measure of the total available hydronium ion concentration present in the resulting solvent. Thus, it is possible that pH and/or associated pKa of a material when measured may have a numeric value represented between −3 and 7.

Typically, the pH of a solution is a measure of its proton concentration or is the inverse proportion of the —OH moiety. It is believed that the stable electrolyte material as disclosed herein, when introduced into a polar solution such as water, facilitates at least partial coordination of hydrogen protons with the hydronium ion electrolyte material and/or its associated lattice or cage. As such, the introduced stable hydronium ion exists in a state that permits selective functionality of the introduced hydrogen associated with the hydrogen ion. Without being bound to any theory, it is believed that this phenomenon may contribute to the biological effectiveness of aqueous compositions containing the stable hydronium material as disclosed herein.

Disclosed herein is a topical composition for application on externally located a target region of a biological life form that comprises:
an active agent selected from the group consisting of stable hydronium electrolyte material;
at least one surface modification agent; and
water.

"Biological life form" as the term is used herein is take to include mammalian life as well as plant life that is engaged in at least some activity associated with life and growth. Non-limiting examples of such include, respiration, metabolic activity and the like. "Target region" as the term is used herein is defined as a region on the skin or outer surface of the associated biological life form.

The stable hydronium electrolyte material to be integrated into the composition as disclosed herein can have the general formula:

$$\left[H_xO_{\frac{(x-1)}{2}}\right]Z_y$$

wherein x is an odd integer ≥3;

wherein y is an integer between 1 and 20; and wherein Z is a monoatomic ion from Groups 14 through 17 having a charge between −1 and −3 or a poly atomic ion having a charge between −1 and −3.

In the compound as disclosed herein, monatomic constituents that can be employed as Z include Group 17 halides such as fluoride, chloride, iodide and bromide; Group 15 materials such as nitrides and phosphides and Group 16 materials such as oxides and sulfides. Polyatomic constituents include carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite. It is contemplated that the composition of matter can be composed of a single one to the materials listed above or can be a combination of one or more of the compounds listed.

It is also contemplated that, in certain embodiments, x is an integer between 3 and 9, with x being an integer between 3 and 6 in some embodiments.

In certain embodiments, y is an integer between 1 and 10; while in other embodiments y is an integer between 1 and 5.

In certain embodiments, the compound that is integrated tin the solution can have the following formula:

$$\left[H_xO_{\frac{(x-1)}{2}}\right]+$$

x is an odd integer between 3 and 12;
y is an integer between 1 and 20; and
Z is one of a group 14 through 17 monoatomic ion having a charge between −1 and −3 or a poly atomic ion having a charge between −1 and −3 as outlined above. With some embodiments having x being an integer between 3 and 9 and y being an integer between 1 and 5.

The compound can be produced by the addition of a suitable inorganic hydroxide to a suitable inorganic acid. The inorganic acid may have a density between 22° and 70° baume; with specific gravities between about 1.18 and 1.93. In certain embodiments, it is contemplated that the inorganic acid will have a density between 50° and 67° baume; with specific gravities between 1.53 and 1.85. The inorganic acid can be either a monoatomic acid or a polyatomic acid.

The inorganic acid and be homogenous or can be a mixture of various acid compounds that fall within the defined parameters. It is also contemplated that the acid may be a mixture that includes one or more acid compounds that fall outside the contemplated parameters but in combination with other materials will provide an average acid composition value in the range specified. The inorganic acid or acids employed can be of any suitable grade or purity. In certain instances, tech grade and/or food grade material can be employed successfully.

In preparing the stable hydronium electrolyte material that is used in the composition disclosed herein, the inorganic acid can be contained in any suitable reaction vessel in liquid form at any suitable volume. In various embodiments, it is contemplated that the reaction vessel can be non-reactive beaker of suitable volume. The volume of acid employed can be a small as 50 ml. Larger volumes up to and including 5000 gallons or greater is within the purview of this disclosure.

The inorganic acid can be maintained in the reaction vessel at a temperature that is generally ambient. It is possible to maintain the initial inorganic acid temperature can be maintained in a range between approximately 23° and about 70° C. However lower temperatures in the range of 15° and about 40° C. can also be employed.

The inorganic acid is mechanically agitated by suitable means to impart mechanical energy at a level between approximately 0.5 HP and 3 HP with agitation levels imparting mechanical energy between 1 and 2.5 HP being employed in certain applications of the process. Agitation can be imparted by a variety of suitable means including but not limited to DC servodrive, electric impeller, magnetic stirrer, chemical inductor and the like.

Agitation can commence at an interval immediately prior to hydroxide addition and can continue for an interval during at least a portion of the hydroxide introduction step.

The acid material of choice may be a concentrated acid with an average molarity (M) of at least 7 or above. In certain procedures, the average molarity will be at least 10 or above; with an average molarity between 7 and 10 being useful in certain applications. The acid of employed may exist and a pure liquid, a liquid slurry or as an aqueous solution of the dissolved acid in essentially concentrated form.

Suitable acid materials can be either aqueous or non-aqueous materials. Non-limiting examples of suitable acid materials can include one or more of the following: hydrochloric acid, nitric acid, phosphoric acid, chloric acid, perchloric acid, chromic acid, sulfuric acid, permanganoic acid, prussic acid, bromic acid, hydrobromic acid, hydrofluoric acid, iodic acid, fluoboric acid, fluosilicic acid, fluotitanic acid. In certain formulation methods, a concentrated strong acid employed can be sulfuric acid having a specific gravity between 55° and 67° baume can be placed can be place in the reaction vessel and mechanically agitated at a temperature between 16° and 70° C.

A defined quantity of suitable hydroxide material can be added to an agitating acid, such as concentrated sulfuric acid that is present in the beaker in a measured, defined amount. The amount of hydroxide that is added will be that sufficient to produce a solid material that is present in the composition as a precipitate and/or a suspended solids or colloidal suspension. The hydroxide material employed can be a water-soluble or partially water-soluble inorganic hydroxide. Partially water-soluble hydroxides employed in the process will generally be those which exhibit miscibility with the acid material to which they are added. Non-limiting examples of suitable partially water-soluble inorganic hydroxides will be those that exhibit at least 50% miscibility in the associated acid. The inorganic hydroxide can be either anhydrous or hydrated.

In certain specific applications of the method employed, a measured, defined quantity of suitable hydroxide material can be added to an agitating acid, such as concentrated sulfuric acid that is present in the beaker in a measured, defined amount. The amount of hydroxide that is added will be that sufficient to produce a solid material that is present in the composition as a precipitate and/or a suspended solids or colloidal suspension. The hydroxide material employed can be a water-soluble or partially water-soluble inorganic hydroxide. Partially water-soluble hydroxides employed in the process will generally be those which exhibit miscibility with the acid material to which they are added. Non-limiting examples of suitable partially water-soluble inorganic hydroxides will be those that exhibit at least 50% miscibility in the associated acid. The inorganic hydroxide can be either anhydrous or hydrated.

Non-limiting examples of water-soluble inorganic hydroxides include water soluble alkali metal hydroxides, alkaline earth metal hydroxides and rare earth hydroxides; either alone or in combination with one another. Other hydroxides are also considered to be within the purview of this disclosure. "Water-solubility" as the term is defined in conjunction with the hydroxide material that will be employed is defined a material exhibiting dissolution characteristics of 75% or greater in water at standard temperature and pressure. The hydroxide that is utilized typically is a liquid material that can be introduced into the acid material as a true solution, a suspension or a super-saturated slurry. In certain embodiments, it is contemplated that the concentration of the inorganic hydroxide in aqueous solution can be dependent on the concentration of the associated acid. Non-limiting examples of suitable concentrations for the hydroxide material are hydroxide concentrations greater than 5 to 50% of a 5 mole material.

Suitable materials include, but are not limited to, lithium hydroxide, sodium hydroxide, potassium hydroxide, ammonium hydroxide, calcium hydroxide, strontium hydroxide, barium hydroxide, magnesium hydroxide, and/or silver hydroxide. Inorganic hydroxide solutions, when employed may have concentration of inorganic hydroxide between 5 and 50% of a 5 mole material with concentration between 5 and 20% in certain applications. The inorganic hydroxide material, in certain processes, can be calcium hydroxide in a suitable aqueous solution such as present as slaked lime.

In the process as disclosed, the inorganic hydroxide in liquid or fluid form is introduced into the agitating acid material in one or more metered volumes over a defined interval to provide a defined resonance time. The resonance time in the process as outlined is considered to be the time interval necessary to promote and provide the environment in which the hydronium ion material develops. The resonance time interval as employed herein is typically between 12 and 120 hours with resonance time intervals between 24 and 72 hours and increments therein being utilized in certain applications.

In various applications of the process, the inorganic hydroxide is introduced into the acid at the upper surface in a plurality of metered volumes. Typically, the total amount of inorganic hydroxide material will be introduced as a plurality of measured portions over the resonance time, with front loaded metered addition being employed in many instances. "Front loaded metered addition" as the term is used herein is taken to mean addition of the total hydroxide volume over an initial percentage of the desired resonance time. Initial percentage values are considered to be between the first 25% and 50% of the total resonance time.

It is to be understood that the proportion of each metered volume that is added can be the same or can vary based on such non-limiting factors as external process conditions, in situ process conditions, specific material characteristics, and the like. It is contemplated that the number of metered volumes can be between 3 and 12. The interval between additions of each metered volume can be between 5 and 60 minutes in certain applications of the process as disclosed. The actual addition interval can be between 60 minutes to five hours.

In certain applications of the process, a 100 ml volume of 5% weight per volume of calcium hydroxide material is added to 50 ml of 66° baume concentrated sulfuric acid in 5 metered increments of 2 ml per minute, optionally with admixture. Addition of the hydroxide to the sulfuric acid results in increasing liquid turbidity that evidences production of calcium sulfate solids as precipitate that is removed in a fashion coordinated with continued hydroxide addition in order to provide a minimum concentration of suspended and dissolved solids.

Without being bound to any theory, it is believed that the addition of calcium hydroxide to sulfuric acid results in the consumption of the initial hydrogen proton or protons associated with the sulfuric acid resulting in hydrogen proton oxygenation such that the proton in question is not off-gassed as would be generally expected upon hydroxide addition, but rather is recombined with ionic water molecule components present in the liquid material.

After the suitable resonance time as defined, the material, as it is produced, is subjected to a non-bi-polar magnetic field at a value greater than 2000 gauss; with magnetic fields great than 2 million gauss being employed in certain applications. It is contemplated that a magnetic field between 10,000 and 2 million gauss can be employed in certain situations. One non-limiting example of a suitable magnetic field generator is found in U.S. Pat. No. 7,122,269 to Wurzburger, the specification of which is incorporated by reference herein.

As desired, solid material present as precipitate or suspended solids can be removed by any suitable means. Such means include but need not be limited to the following: gravimetric, forced filtration, centrifuge, reverse osmosis and the like.

The compound employed is a shelf-stable viscous liquid that is believed to be stable for at least one year when stored at ambient temperature and 50 to 75% relative humidity. The composition of matter can be use neat in various end use applications. The composition of matter can have a 1.87 to 1.78 molar solution that contains 8 to 9% of the total moles of acid protons that are not charged balanced.

The stable electrolyte composition of matter which results from the process as disclosed has molarity of 200 to 150 M strength, and 187 to 178 M strength in certain instances, when measured titramtrically though hydrogen coulometry and via FFTIR spectral analysis. The material has a gravimetric range greater than 1.15; with ranges greater than 1.9 in in certain instances. The material when analyzed can be shown to yield up to 1300 volumetric times of orthohydrogen per cubic ml versus hydrogen contained in a mole of water.

It is also contemplated that the composition of matter as disclosed can be introduced into a polar solvent and will result in a solution having concentration of hydronium ions greater than 15% by volume. In some applications, the concentration of hydronium ions can be greater than 25% and it is contemplated that the concentration of hydronium ions can be between 15 and 50% by volume.

The polar solvent can be either aqueous, or a mixture of aqueous and organic materials. In situations where the polar solvent includes organic components, it is contemplated that the organic component can include at least one of the following: saturated and/or unsaturated short chain alcohols having less than 5 carbon atoms, and/or saturated and unsaturated short chain carboxylic acids having less than 5 carbon atoms. Where the solvent comprises water and organic solvents, it is contemplated that the water to solvent ratio will be between 1:1 and 400:1, water to solvent, respectively.

The ion complex that is present in the aqueous composition as disclosed herein may have any suitable structure and solvation that is generally stable and capable of functioning as an oxygen donor in the presence of the environment created to generate the same. Particular embodiments, the ion is depicted by the following formula:

$$\left[H_xO_{\frac{(x-1)}{2}}\right]+$$

wherein x is an odd integer ≥3.

It is contemplated that ion as defined herein exists in unique ion complexes having greater than seven hydrogen atoms in each individual ion complex which are referred to in this disclosure as hydronium ion complexes. As used herein the term "hydronium ion complex" can be broadly defined as the cluster of molecules that surround the cation $H_xO_{x-1}+$ where x is an integer greater than or equal to 3. The hydronium ion complex may include at least four additional hydrogen molecules and a stoichiometric proportion of oxygen molecules complexed thereto as water molecules. Thus, the formulaic representation of non-limiting examples of the hydronium ion complexes that can be employed in the process herein can be depicted by the formula:

$$\left[H_xO_{\frac{(x-1)}{2}} + (H_2O)_y\right]$$

where x is an odd integer of 3 or greater; and
y is an integer from 1 to 20, with y being an integer between 3 and 9 in certain embodiments.

In various embodiments disclosed herein, it is contemplated that at least a portion of the hydronium ion complexes will exist as solvated structures of hydronium ions having the formula $$H_5+xO_{2y}+$$

wherein x is an integer between 1 and 4; and
y is an integer between 0 and 2.

In such structures, a

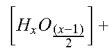

core is protonated by multiple $H_2O$ molecules. It is contemplated that the hydronium complexes present in the composition of matter as disclosed herein can exist as Eigen complex cations, Zundel complex cations or mixtures of the two. The Eigen solvation structure can have the hydronium ion at the center of an $H_9O_4+$ structure with the hydronium complex being strongly bonded to three neighboring water molecules. The Zundel solvation complex can be an $H_5O_2+$ complex in which the proton is shared equally by two water molecules. The solvation complexes typically exist in equilibrium between Eigen solvation structure and Zundel solvation structure. Heretofore, the respective solvation structure complexes generally existed in an equilibrium state that favors the Zundel solvation structure.

The present disclosure is based, at least in part, on the unexpected discovery that stable materials can be produced in which hydronium ion exists in an equilibrium state that favors the Eigen complex. The present disclosure is also predicated on the unexpected discovery that increases in the concentration of the Eigen complex in a process stream can provide a class of novel enhanced oxygen-donor oxonium materials.

The process stream as disclosed herein can have an Eigen solvation state to Zundel solvation state ratio between 1.2 to 1 and 15 to 1 in certain embodiments; with ratios between 1.2 to 1 and 5 to 1 in other embodiments.

The novel enhanced oxygen-donor oxonium material as disclosed herein can be generally described as a thermodynamically stable aqueous acid solution that is buffered with an excess of proton ions. In certain embodiments, the excess of protons ions can be in an amount between 10% and 50% excess hydrogen ions as measured by free hydrogen content.

It is contemplated that oxonium complexes employed in the process discussed herein can include other materials employed by various processes. Non-limiting examples of general processes to produce hydrated hydronium ions are discussed in U.S. Pat. No. 5,830,838, the specification of which is incorporated by reference herein.

The composition disclosed herein can also employ a compound having the following chemical structure:

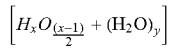

wherein x is an odd integer ≥3;
y is an integer between 1 and 20; and
Z is a polyatomic or monoatomic ion.

The polyatomic ion employed can be an ion derived from an acid having the ability to donate one or more protons. The associated acid can be one that would have a pKa values ≥1.7 at 23° C. The ion employed can be one having a charge of +2 or greater. Non-limiting examples of such ions include sulfate, carbonate, phosphate, chromate, dichromate, pyrophosphate and mixtures thereof. In certain embodiments, it is contemplated that the polyatomic ion can be derived from mixtures that include polyatomic ion mixtures that include ions derived from acids having pKa values ≤1.7.

In certain embodiments, the composition of matter can have the following chemical structure:

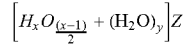

wherein x is an odd integer between 3-11;
y is an integer between 1 and 10; and
Z is a polyatomic ion.

The polyatomic ion can be derived from an ion derived from an acid having the ability to donate on or more protons. The associated acid can be one that would have a $pK_a$ values ≥1.7 at 23° C. The ion employed can be one having a charge of +2 or greater. Non-limiting examples of such ions include sulfate, carbonate, phosphate, oxalate, chromate, dichromate, pyrophosphate and mixtures thereof. In certain embodiments, it is contemplated that the polyatomic ion can be derived from mixtures that include polyatomic ion mixtures that include ions derived from acids having $pK_a$ values ≤1.7.

In certain embodiments, the composition can include an effective amount of is composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1), and mixtures thereof. The composition can also be expressed as a stoichiometrically balanced chemical composition of at least one of the following: hydrogen, triaqua-μ3-oxotri sulfate; hydrogen, triaqua-μ3-oxotri carbonate; hydrogen, triaqua-μ3-oxotri phosphate; hydrogen, triaqua-μ3-oxotri oxalate; hydrogen, triaqua-μ3-oxotri chromate; hydrogen, triaqua-μ3-oxotri dichromate; hydrogen, triaqua-μ3-oxotri pyrophosphate; and mixtures thereof, wherein the components of the chemical compound are included at a 1:1 ratio.

It is also contemplated that the composition may include an effective amount of alkaline oxonium ion derived complexes alone or in combination with the stable hydronium compounds disclosed previously. As defined herein "alkaline oxonium ion complexes" are generally defined as negative oxygen anion having at least one trivalently bonded oxygen when the molecule is present as its basic salt. In certain embodiments the oxygen anion will exist in aqueous solution as a population predominantly composed of atoms having four, five and/or six hydrogen atoms bonded to a number of oxygen atoms that is at least one less than the number of hydrogens present.

When the composition of matter as disclosed herein is admixed with an aqueous or polar solvent, the resulting composition is as solution can be composed of basic or alkaline hydronium ions, basic or alkaline hydronium ion complexes and the like. Suitable anionic materials can also be referred to as alkaline hydroxonium ion complexes.

When introduced into the aqueous component in the composition as disclosed herein, it is believed that, the stable anionic material disclosed herein will complex with water molecules to form unique hydration cages of various geometries, non-limiting examples of which will be described in greater detail subsequently. The alkaline electrolyte material as disclosed herein, when introduced into aqueous solution or polar solvent is stable and can be isolated from the associated aqueous solution or polar solvent by processes that will be described in detail subsequently.

The amphoteric cationic component in the anionic compound can be an ion typically derived from one or more strong inorganic acids. Non-limiting examples of suitable strong inorganic acids are those having a $pK_a \geq 1.74$, which, when added to water, will ionize completely in an aqueous solution. Weaker acids, such as those having a $pK_a < 1.74$, when added to water, will achieve less than complete ionization in aqueous solution but may have utility in certain applications.

The stable anionic hydronium material that is employed in the composition as disclosed herein, provides a source of concentrated anionic hydronium ions that has an extended shelf life and provides a long-lasting source of available anionic hydronium ion material when added to a solution such as water or a suitable polar solvent component of the present composition. The material disclosed herein maintains performance efficacy over extended or prolonged time periods.

In certain embodiments, the compound employed when present in the water component can have the following chemical structure:

$$H_xO_{x-y}{}^{a-}Z^{b+}$$

wherein x is an integer greater than 3;
y is an integer less than x;
a is a value between 1 and 6;
b is a value between 1 and 3;
Z is a monoatomic cation, polyatomic cation or cationic complex.

The anion $H_xO_{x-y}{}^{a-}$ can be present in loose coordinated clustered relationship; forming stable hydration complexes.

The hydration complexes can have various geometries which can vary based on factors such as the value of x. One non-limiting geometry of the hydronium anion $H_4O_3{}^{2-}$ is depicted in FIG. 1. It is theorized that the hydronium anion $H_4O_3{}^{2-}$ will have two hydrogen atoms bonded to each respective oxygen atom in the anionic molecule with at least two of hydrogen atoms shared between two of the respective oxygen atoms. In the molecule depicted the alpha, beta and gamma oxygen atoms are sequentially oriented. The H—O—H bond angle for the beta oxygen is estimated to be between 105° to 108°; while the H—O—H bond angles for the alpha and gamma oxygen atoms are each estimated to be greater than 130° but less than 140°.

The polyatomic cation can be derived from a material having at least one amphoteric radical. In certain embodiments, the polyatomic cation employed can be an amphoteric cation having a charge of or greater. Non-limiting examples of such negative cations include sulfate, carbonate, phosphate, chromate, dichromate, polyphosphate, orthophosphate and mixtures thereof. In certain embodiments, it is contemplated that the amphoteric polyatomic cation can be derived from acids having $pK_a$ values ≤1.7.

The cation Z can be a monoatomic cation from the alkali, alkali earth metal, transition metals, post transition metals and the like. In certain embodiments, these monatomic cations can be Group 1 materials such as lithium, sodium, and potassium; Group 2 materials such as beryllium, magnesium, calcium, Group 4 materials such as titanium, Group 5 materials such as vanadium and niobium; Group 6 materials such as chromium and molybdenum; Group 7 material such as manganese; Group 8 materials such as iron; Group 9 materials such as cobalt; Group 10 materials such as nickel and palladium; Group 11 materials such as copper, silver and gold; Group 12 materials such as zinc and cadmium; and Group 13 materials such as aluminum.

In certain embodiments, the monoatomic cation Z will have a charge equal to or greater than +2. Non-limiting examples of such materials include the Group 2 materials as well as aluminum. Other cations that are contemplated include iron(III), iron(II), copper(II), cobalt(III), cobalt(II), tin(II), tin(IV), lead(II), lead(IV), mercury(II) and mercury (I).

Suitable cation complexes Z that can include boron-magnesium complexes such as boron-nickel, boron-lithium, magnesium-lithium, magnesium-silicon, and lithium-silicon. The cation employed can have a charge of +2 or greater in certain embodiments and applications.

In many situations, the stable alkaline electrolyte material as disclosed herein is stable at standard temperature and pressure and can exist as a water-like liquid having wetting characteristics less than water; i.e. less than 70 dynes/cm. The electrolyte material can be added to water or other polar solvents to produce a solution that contains an effective concentration of stable hydronium anion material in either the non-dissociated state, the dissociated state or a combination of the two that is greater than 1 part per million. In certain applications the electrolyte material can be present in concentrations greater than 0.5% by weight. It is contemplated that the alkaline electrolyte material can be present at concentration maximums up to between 10 to 1 mole ratio equivalents and 5 to 1 mole ratio equivalents. That is, it would take approximately 10 molar equivalents of a suitable standard inorganic acid, for example hydrochloric acid, to neutralize one mole of the material disclosed herein.

It has been found, quite unexpectedly, that the hydromiun anion derived from the addition of the stable alkaline electrolyte material disclosed herein alter the acid functionality of the resulting material without the concomitant alteration of the free to total acid ratio. The alteration in acid functionality can include characteristics such as changes in measured pH, changes in free-to-total acid ratio, changes in specific gravity and rheology. Changes in spectral and chromatography output are also noted as compared to the incumbent materials used in production of the stable alkaline electrolyte material that contains the alkaline hydronium ion complex disclosed herein. Addition of the stable hydronium ion material as disclosed herein results in changes in $pK_b$ which do not correlate to the changes that would be typically observed in free-to-total acid ratio.

Thus, the addition of the stable alkaline hydronium electrolyte material as disclosed herein to an aqueous solution having a pH between 6 and 8 results in a solution having an effective $pK_b$ between 8 and 14. It is also to be understood that $K_b$ of the resulting solution can exhibit a value greater than 14 when measured by a calomel electrode, specific ion ORP probe. As used herein the term "effective $pK_b$" is defined as a measure of the total available hydronium anion concentration present in the resulting solvent or solution and can be defined as the inverse reciprocal of $pK_a$. Given the performance characteristics of various probes and measurement devices, it is possible that pH and/or associated $pK_a$ of a material when measured may have a numeric value represented between 7 and 16.

Typically, the pH of a solution is a measure of its proton concentration or is the inverse proportion of the —OH moiety. It is believed that the stable alkaline electrolyte material disclosed herein, when introduced into a matrix such as a polar solution, facilitates at least partial coordination of hydrogen protons with the hydronium anion electrolyte material and/or its associated complex existing as complexes of one or more hydronium ion s in complex with one another. As such, the introduced stable hydronium anion exists in a state that permits selective functionality of the introduced hydroxyl moieties relative to other components present in the associated matrix such as the polar solution.

More specifically, the stable electrolyte material as disclosed herein can have the general formula:

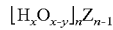

x is an integer ≥4;
y is an integer less than x;
n is an integer between 1 and 4; and
Z is an amphoteric polyatomic ion having a charge between +1 and +3.

Amphoteric polyatomic constituents include carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite. It is contemplated that the composition of matter can be composed of a single one to the materials listed above or can be a combination of one or more of the compounds listed.

It is also contemplated that, in certain embodiments, x is an integer between 3 and 9, with x being an integer between 3 and 6 in some embodiments.

In certain embodiments, y is an integer having a value of y=1, and, where applicable, y=2 or y=3.

The composition of matter as disclosed herein can have the following formula, in certain embodiments:

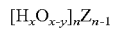

x is an odd integer between 4 and 6;
y is an integer less than x and between 1 and 3; and
Z is an amphoteric polyatomic ion having a charge between 1 and 3 and can be one of more of the following: carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite.

It is contemplated that the composition of matter exists as an isomeric distribution in which the value x is an average distribution of integers greater than 3 favoring integers between 4 and 6.

The composition of matter as disclosed herein can be formed by the addition of a suitable inorganic acid to a suitable inorganic hydroxide. The inorganic acid may have a density between 22° and 70° baume; with specific gravities between about 1.18 and 1.93. In certain embodiments, it is contemplated that the inorganic acid will have a density between 50° and 67° baume; with specific gravities between 1.53 and 1.85. The inorganic acid can be either a monoatomic acid or a polyatomic acid.

The inorganic acid can be homogenous or can be a mixture of various acid compounds that fall within the defined parameters. It is also contemplated that the acid may be a mixture that includes one or more acid compounds that fall outside the contemplated parameters but in combination with other materials will provide an average acid composition value in the range specified. The inorganic acid or acids employed can be of any suitable grade or purity. In certain instances, tech grade and/or food grade material can be employed successfully.

The hydroxide material employed can be a water-soluble or partially water-soluble inorganic hydroxide. Partially water-soluble hydroxides employed in the process will generally be those which exhibit miscibility with the acid material to be added. Non-limiting examples of suitable partially water-soluble inorganic hydroxides will be those that exhibit at least 50% miscibility in the associated acid. The inorganic hydroxide can be either anhydrous or hydrated.

Non-limiting examples of water-soluble inorganic hydroxides include water soluble alkali metal hydroxides, alkaline earth metal hydroxides and rare earth hydroxides; either alone or in combination with one another. Other hydroxides are also considered to be within the purview of this disclosure. "Water-solubility" as the term is defined in conjunction with the hydroxide material that will be employed is defined a material exhibiting dissolution characteristics of 75% or greater in water at standard temperature and pressure. The hydroxide that is utilized typically is a liquid material that can be introduced into the acid material as a true solution, a suspension or super-saturated slurry. In certain embodiments, it is contemplated that the concentration of the inorganic hydroxide in aqueous solution can be dependent on the concentration of the associated acid. Non-limiting examples of suitable concentrations for the hydroxide material are hydroxide concentrations greater than 5 to 50% of a 5 mole material.

Suitable materials include, but are not limited to, lithium hydroxide, sodium hydroxide, potassium hydroxide, ammonium hydroxide, calcium hydroxide, strontium hydroxide, barium hydroxide, magnesium hydroxide, and/or silver hydroxide. Inorganic hydroxide solutions, when employed may have concentration of inorganic hydroxide between 5 and 50% of a 5 mole material with concentration between 5 and 20% in certain applications. The inorganic hydroxide material, in certain processes, can be calcium hydroxide in a suitable aqueous solution such as present as slaked lime.

In preparing the stable electrolyte material as disclosed herein, an inorganic base can be contained in any suitable reaction vessel in liquid form at any suitable volume. In various embodiments, it is contemplated that the reaction vessel can be non-reactive beaker of suitable volume. The volume of inorganic base that can be employed can be a small as 50 ml. Larger volumes up to and including 5000 gallons or greater are also considered to be within the purview of this disclosure.

The inorganic base can be maintained in the reaction vessel at a temperature that is generally ambient. It is possible to maintain the initial inorganic base temperature in a range between approximately 23° and about 70° C. However lower temperatures in the range of 15° and about 40° C. can also be employed.

The inorganic base can be mechanically agitated by suitable means to impart mechanical energy at a level between approximately 0.5 HP and 3 HP with agitation levels imparting mechanical energy between 1 and 2.5 HP being employed in certain applications of the process. Agitation can be imparted by a variety of suitable means including but not limited to DC servodrive, electric impeller, magnetic stirrer, chemical inductor and the like.

Agitation can commence at an interval immediately prior to acid addition and can continue for an interval during at least a portion of the acid introduction step.

The acid material that is to be introduced may be maintained in any suitable vessel from which the material can be dispensed in a measured metered manner. The vessel can include suitable heating elements if desired or required that are configured to provide heated material at a temperature between ambient and approximately 200° F.; with temperatures between ambient and 70° C. being employed in certain embodiments.

In the process as disclosed herein, the acid material of choice may be a concentrated acid with an average molarity (M) of at least 7 or above. In certain procedures, the average molarity will be at least 10 or above; with an average molarity between 7 and 10 being useful in certain applications. The acid of employed may exist and a pure liquid, a liquid slurry or as an aqueous solution of the dissolved acid in essentially concentrated form.

Suitable acid materials can be either aqueous or non-aqueous materials. Non-limiting examples of suitable acid materials can include one or more of the following: hydrochloric acid, nitric acid, phosphoric acid, chloric acid, perchloric acid, chromic acid, sulfuric acid, permanganic acid, prussic acid, bromic acid, hydrobromic acid, hydrofluoric acid, iodic acid, fluoboric acid, fluosilicic acid, fluotitanic acid.

In certain embodiments, the concentrated strong acid employed can be sulfuric acid having a specific gravity between 55° and 67° baume. This material can be placed can be place in the reaction vessel and mechanically agitated at a temperature between 16° and 70° C.

In certain specific applications of the method disclosed a measured, a defined quantity of the suitable acid material can be added to a defined amount of agitating hydroxide that is present in the beaker. The amount of acid that is added will be that sufficient to produce a solid material that is present in the composition as a precipitate and/or a suspended solids or colloidal suspension.

In the process as disclosed, the acid material is added to the agitating inorganic hydroxide in one or more metered volumes over a defined interval to provide a defined resonance time. The resonance time in the process as outlined is considered to be the time interval necessary to promote and provide the environment in which the hydronium anion material develops. The resonance time interval as employed herein is typically between 12 and 120 hours with resonance time intervals between 24 and 72 hours and increments therein being utilized in certain applications.

In various applications of the process, the acid is introduced into the inorganic hydroxide at the upper surface in a plurality of metered volumes. Typically the total amount of the acid material will be introduced as a plurality of measured portions over the associated resonance time, with front loaded metered addition being employed in many instances. "Front loaded metered addition" as the term is used herein is taken to mean addition of the total acid volume over an initial percentage of the desired resonance time. Initial percentage values are considered to be between the first 25% and 50% of the total resonance time.

It is to be understood that the proportion of each metered volume that is added can be the same or can vary based on such non-limiting factors as external process conditions, in situ process conditions, specific material characteristics, and the like. It is contemplated that the number of metered volumes can be between 3 and 12. The interval between additions of each metered volume can be between 5 and 60 minutes in certain applications of the process as disclosed. The actual addition interval can be between 60 minutes to five hours.

In certain applications of the process, a 100 ml volume of 66° baume concentrated sulfuric acid material is added to 50 ml of 5% by weight calcium hydroxide in 5 metered increments of 2 ml per minute with admixture. Addition of the sulfuric acid to the calcium hydroxide results in increasing liquid turbidity that evidences production of calcium sulfate solids as precipitate that is removed in a fashion coordinated with continued acid addition in order to provide a minimum concentration of suspended and dissolved solids.

Without being bound to any theory, it is believed that the addition of sulfuric acid to calcium hydroxide results in the consumption of the initial hydrogen proton or protons associated with the introduced sulfuric acid resulting in hydrogen proton oxygenation such that the proton in question is not off-gassed as would be generally expected upon acid addition, but rather is recombined with ionic water molecule components present in the liquid material.

After completion of the suitable resonance time as defined, the material, as it is produced, is subjected to a non-bi-polar magnetic field at a value greater than 2000 gauss; with magnetic fields great than 2 million gauss being employed in certain applications. It is contemplated that a magnetic field between 10,000 and 2 million gauss can be employed in certain situations as indicated previously.

The component as described is a shelf-stable viscous liquid that is believed to be stable for at least one year when stored at ambient temperature and 50 to 75% relative humidity. The compound can have a 1.87 to 1.78 molar solution that contains 8 to 9% of the total moles of acid protons that are not charged balanced.

The alkaline compound that is employed in the composition can have a molarity of 200 to 150 M strength, and 187 to 178 M strength in certain instances, when measured titramtrically though hydrogen coulometery and via FFTIR spectral analysis. The material has a gravimetric range greater than 1.15; with ranges greater than 1.9 in in certain instances. The material when analyzed can be shown to yield up to 1300 volumetric times of orthohydrogen per cubic ml versus hydrogen contained in a mole of water.

It is also contemplated that the composition of matter as disclosed can be introduced into a polar solvent and will result in a solution having concentration of hydronium anions greater than 15% by volume. In some applications, the concentration of hydronium anions can be greater than 25% and it is contemplated that the concentration of hydronium anions can be between 15 and 50% by volume.

The topical or surface treatment composition for use on a target region of a biological life from composition for application In situations where the polar solvent includes organic components, it is contemplated that the organic component can include at least one of the following: saturated and/or unsaturated short chain alcohols having less than 5 carbon atoms, and/or saturated and unsaturated short chain carboxylic acids having less than 5 carbon atoms. Where the solvent comprises water and organic solvents, it is contemplated that the water to solvent ratio will be between 1:1 and 400:1, water to solvent, respectively.

The ion complex that is present in the solvent material as describes herein may have any suitable structure and solvation that is generally stable and capable of functioning as an oxygen donor in the presence of the environment created to generate the same. Particular embodiments, the ion is depicted by the following formula:

$$[H_xO_{x-y}]_n{-}$$

wherein x is an integer ≥4;
y is an integer less than x;
n is an integer between 1 and 4; and
Z is an amphoteric polyatomic ion having a charge between +1 and +3.

It is contemplated that ion as defined herein exists in unique anion complexes having between 4 and 7 hydrogen atoms in complex with a lesser number of oxygen atoms in each individual anion complex which are referred to in this disclosure as hydronium anion complexes. As used herein the term "hydronium anion complex" can be broadly defined as the cluster of molecules that surround the cation $H_xO_{x-y}$—where x is an integer greater than or equal to 4. The hydronium anion complex may include at least four additional hydrogen molecules and a stoichiometric proportion of oxygen molecules complexed thereto as water molecules. Thus, the formulaic representation of non-limiting examples of the hydronium ion complexes that can be employed in the process herein can be depicted by the formula:

In certain embodiments, the composition of matter is composed of a stoichiometrically balanced hydrogen peroxide hydroxyl sulfate hydrate.

The composition as disclosed herein also includes an effective amount of at least one surface modifying agent. Suitable surface modifying agents can be those that advantageously alter the wetting and/or retention characteristics of the resulting compositions. Non-limiting examples of such surface modifying agents include one or more cationic and nonionic surfactants alone or in combination. Non-limiting examples of suitable surfactants that can be employed include polyethers such as polyethylene glycol, polypropylene glycol, polytetramethylene glycol and the like. Where desired or required, various suitable polyethylene glycols can be present as branched polyethylene glycols having 3 to 10 PEG chains emanating from a central core. Suitable polyethylene glycols include those having an average molecular weight between about 100 and about 800 daltons, with average molecular weights between 300 and 500 begin employed in certain embodiments. One non-limiting example of a suitable polyethylene glycol surfactant would be PEG 400 commercially available under the tradename CARBOWAX 400 from Dow Chemical Corporation include various material such as octaethylene glycol monododecyl ether, pentaethylene glycol monododecyl ether and the like.

Other examples of non-ionic surfactants include, are not limited to, polyethylene glycol alkyl ethers, polyoxypropyleneglycol alkyle ethers, glucosides, polyoxyethylene glycol octylphenol ethers, polyoxyethylene glycol alkylphenol ethers, glycerol esters, polysorbates, fatty alcohol ethoxylates, and the like. Non-limiting examples of cationic surfactants include various monoalkyl quaternary systems, ammonium alkyl sulfates and the like In certain applications, the composition can employ a surfactant composition that is a combination of non-ionic and cationic surfactants. Non-ionic-cationic blends can have a ration non-ionic to cationic in a ration between 1:2 and 2:1 with rations between 1:1.5 and 1:0.75 being employed in certain applications. In certain applications, the surface modifying component can be a mixture of a suitable ammonium alkyl sulfate that composes between 10 and 30 volume percent of the surface active component of the composition, a non-ionic surface active component such as a suitable fatty alcohol ethoxylate, present in and amount between 10 and 30 volume percent of the surface modifying component and a glycolic component such polyethylene glycol preset in an amount between 40 and 80% of the surfactant portion. In certain embodiments, the non-ionic and cationic surfactants can be derived from a blend of materials found in material commercially available from Stepan Chemical under the tradename STEPOSOL. One suitable surfactant combination is STEPOSOL DG. STEPASOL DG is believed to be a proprietary blend of cationic and nonionic surfactants. The Polyethylene glycol component can be a material such as CARBOWAX 400. Where there two materials are employed, it is contemplated that the CARBOWAX 400 will be present in an amount between about 0.25 and 0.75 volume % of the total composition. The non-ionic/cationic surfactant blend such as STEPASOL DG will be present in an amount between about 0.1 and 0.5 percent by total composition volume.

In the composition disclosed herein, the material can contain between 20 volume % and 50 volume of a stable alkaline derivative of oxonium and between 0.5 and 5.0 volume percent of a stable hydronium compound dissolved in an aqueous material. In certain embodiments, the stable alkaline derivative of oxonium can be a stoichiometrically balanced hydrogen peroxide hydroxyl sulfate hydrate as disclosed herein. The stable hydronium compound can be one as disclosed herein, with one selected from the group consisting of hydrogen (1+), triaqua-µ3-oxotri sulfate (1:1); hydrogen (1+), triaqua-µ3-oxotri carbonate (1:1), hydrogen (1+), triaqua-µ3-oxotri phosphate, (1:1); hydrogen (1+), triaqua-µ3-oxotri oxalate (1:1); hydrogen (1+), triaqua-µ3-oxotri chromate (1:1) hydrogen (1+), triaqua-µ3-oxotri dichromate (1:1), hydrogen (1+), triaqua-µ3-oxotri pyrophosphate (1:1), and mixtures thereof. It is understood that compound employed can be expressed in the following manner: hydrogen, triaqua-µ3-oxotri sulfate; hydrogen, triaqua-µ3-oxotri carbonate; hydrogen, triaqua-µ3-oxotri phosphate; hydrogen, triaqua-µ3-oxotri oxalate; hydrogen, triaqua-µ3-oxotri chromate; hydrogen (1+), triaqua-µ3-oxotri dichromate; hydrogen, triaqua-µ3-oxotri pyrophosphate; and mixtures thereof, wherein the components of the chemical compound are included at a 1:1 ratio.

The composition as disclosed herein can be employed as a topically applied solution that can be employed on a variety of target regions on biological life forms that include, but are not limited to, plant leaves and stems, hair, mammalian skin tissue and the like. When employed as a topical solution for use with plants, non-limiting of plants for which the composition can be advantageously employed include various food or medicinal agricultural plant species as well as broad leaf ornamental and house plant species. Agricultural species that can be treated with the composition as disclosed herein include, but are not limited to, agricultural and medicinal plants such as those from the following species: *vitacae, zea, cururbiteae rosaceae, adoxaceae, cannabacae, solanaceae*. Ornamental plants include but are not limited to vining plants such as philodendron, *yucca* and the like as well as arborial plants, many of which present with as leaf spots, mildew or other leaf blights.

Some commonly observed leaf spot diseases of shade trees and shrubs and agricultural crops include powdery mildew, anthracnose, and apple scab. Additionally, there are many other leaf spot diseases that occur on a wide range of native and ornamental trees and shrubs. it is believed that such diseases, weaken the associated plant by interrupting photosynthesis, the process by which plants create energy that sustains growth and defense systems and influences survival. The diseases can result in leaf loss that reduces yield associated with various food crop plants can result in reduced growth and in increased susceptibility to opportunistic pests and pathogens.

Many leaf spot pathogens are only able to produce symptoms in leaf tissue; however, some leaf spot pathogens can also cause blight or cankers of twigs. Blight refers to a progressive dieback of young, green shoots. Leaf spot pathogens that cause dieback of young shoots typically do not progress to infect the older woody branches. Many leaf spot pathogens are only able to produce symptoms in leaf tissue; however, some leaf spot pathogens can also cause blight or cankers of twigs. Blight refers to a progressive dieback of young, green shoots. Downy mildew is caused by a group of pathogens known as water molds or Oomycetes, which are related to algae. On trees and shrubs, downy mildew is often caused by the water molds, Water molds thrive in wet conditions and can be very problematic in rainy years. Downy mildew is rarely a problem in hot dry weather. Bacterial leaf spot diseases often start as small dark brown to black spots with a halo of yellow tissue surrounding each spot. In some bacterial leaf spot diseases, the center of the leaf spot will dry up and fall out, giving the leaf a "shot hole" appearance. If weather conditions remain favorable for disease, some bacterial leaf spots will grow together creating large black blotches on leaves or turning leaves completely black. Shoots, buds and occasionally flowers can also become black and blighted by bacterial leaf spot pathogens. Bacterial leaf spot diseases are most commonly caused by the bacterial pathogens. Bacterial plant pathogens often live on plant surfaces in low numbers without causing immediate symptoms. They can also travel long distances on moist air currents or be moved short distances on splashing rain and irrigation. When weather conditions are right, pathogen populations grow dramatically and cause disease.

In the method disclosed herein, the composition as disclosed herein is applied to a target surface such as the surface of leaves of a plant evidencing an infestation such as at least one of a mold, mildew, rust spot bacterial infestation or the like or at risk of developing the same. The composition may be applied by any suitable method including, but not limited to at least one of aerosolized spray application, atomized spray application, misting, and the like. The process can include at least one application or can include multiple application over a predetermined interval such as a week to ten days in certain embodiments.

Without being bound to any theory, it is believed that the biological material that constitutes the infestation present on the leaf surface is selectively susceptible to contact with the composition. It is also believed that application of the composition as disclosed herein provides a balanced a regulated concentration of the stoichiometrically balanced hydrogen peroxide hydroxyl sulfate hydrate compound as disclosed herein at a very narrow pH control point that furnishes complexed amounts of —OH radicals in conjunction with acidic binary polymeric hydronium clusters that facilitate alkaline earth metals such as CA, Mg, Ba and the like to be more effectively solubilized and ionized in water during osmotic transfer. It is also believed that application of the composition as disclosed herein contributes to buffering of the fluid in an around the leaves so treated which results in stability and less variability in pH, relative humidity and temperature at the interstitial interface of the leaf surface. It is also believed that application of the composition as disclosed herein can maintain surface cleanliness and thereby more effectively promote more effective transfer between the leaf interior and the leaf. Finally, it is believed that the formulation as disclosed herein can be employed to retard chemical and UV burning on the leaf areas which thereby promotes and allows a greater surface area to be effectively used for photosynthetic reactions and that the material promotes lower surface tension which results in more effective transfer of H+, oxygen and water molecules and more consistent regulation of the same.

In order to better illustrate the present disclosure, reference is directed to the following non-limiting examples.

Example I

Forty plants of the genus cannabis were prepared for indoor cultivation with four of the plants used as controls. The remaining thirty-six plants were each inoculated with one of twelve different strains of fungal infestation. The Infestation was permitted to establish itself for a periios of four days. After this, foliar applications of a composition containing 57 vol % water, 1 vol % hydrogen (1+), triaqua-µ3-oxotri sulfate (1:1), 46.3 vol % hydrogen peroxide hydroxyl sulfate hydrate, 0.5 vol % CARBOWAX PEG 400 and 0.2 vol % STEPASOL DG were applied seven times during week two of the none week flower period by atomized spraying a volume of approximately 100 ml per application onto the leaf surfaces of 24 of the inoculated plants. The plants were visually inspected daily to ascertain the amount of infestation present. By the end of week three, no sign of contamination was found on the treated plants.

To test the efficacy of dilute spray materials, 24 mil of the composition as outlined in Example I was admixed with two gallons of water and applied by spraying over a perison of nine days in three intervals beginning at two weeks into the flowering cycle to plants inoculated as outlined in Example I. the test plants were visually inspected. By the end of week four, the inoculated plants treated with the material as disclosed herein evidenced no apparent infestation. The various plants were permitted to complete their growth cycle. The treated plants evidenced greater vigor during growth and the plant leaves and flowers evidenced greater mass upon harvest.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A composition comprising:

Between 0 and 5.0 volume % of a first compound of the general formula:

$$\left[H_xO_{\frac{(x-1)}{2}}\right]Z_y$$

wherein x is an odd integer ≥3;

y is an integer between 1 and 20; and

Z is one of a monoatomic ion from Groups 14 through 17 having a charge value between −1 and −3 or a polyatomic ion having a charge between −1 and −3;

between 20.0 and 50.0 volume % of a second compound having the formula:

$$Z'—H_{x'}O_{x'\cdot y'},$$

wherein x' is an integer greater than 3 y' is an integer less than x'; and

Z' is one of a monoatomic cation, a polyatomic ion or a cationic complex; and between 0.1 and 1 volume % polyalkylene glycol having an average molecular weight between 200 and 500;

between 0.01 and 1.0 volume percent of a non-ionic/cationic surfactant blend comprising a fatty alcohol alkoxylate and an ammonium alkyl sulfate; and water.

2. The composition of claim 1, when the compound is wherein x is an integer between 3 and 11 and y is an integer between 1 and 10.

3. The composition of claim 1 wherein the polyatomic ion of the second compound has a charge of −2 or greater.

4. The composition of claim 1 wherein Z is selected from the group consisting of sulfate, carbonate, phosphate, oxalate, chromate, dichromate, pyrophosphate and mixtures thereof.

5. The composition of claim 1 wherein the first compound is a stoichiometrically balanced chemical compound of at least one of the following: hydrogen, triaqua-µ3-oxotri sulfate; hydrogen, triaqua-µ3-oxotri carbonate; hydrogen, triaqua-µ3-oxotri phosphate; hydrogen, triaqua-µ3-oxotri oxalate; hydrogen, triaqua-µ3-oxotri chromate; hydrogen, triaqua-µ3-oxotri dichromate; hydrogen, triaqua-µ3-oxotri pyrophosphate; and mixtures thereof, wherein the components of the stoichiometrically balanced chemical compound are present in a 1:1 ratio.

6. A composition comprising:
between 0.5 and 3.0 volume % of a first compound having the following chemical structure:

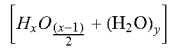

wherein x is an odd integer ≥3;
y is an integer between 1 and 20; and
Z is one of a monoatomic ion from Groups 14 through 17 having a charge value between −1 and −3 or a polyatomic ion having a charge between −1 and −3;
between 30.0 and 50.0 volume % of a second compound having the following chemical structure:

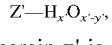

wherein x' is an integer greater than 3
y' is an integer less than x'; and
Z' is one of a monoatomic cation, a polyatomic ion or a cationic complex; and water.

7. The composition of claim 6 wherein x is an integer between 3 and 11 and y is an integer between 1 and 10.

8. The composition of claim 6 wherein the polyatomic ion Z' has a charge of −2 or greater.

9. The composition of matter of claim 8 wherein Z or Z' is selected from the group consisting of sulfate, carbonate, phosphate, oxalate, chromate, dichromate, pyrophosphate and mixtures thereof.

10. The composition of claim 6 wherein the first compound having the chemical structure:

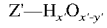

is a stoichiometrically balanced chemical composition of at least one of the following: hydrogen, triaqua-µ3-oxotri sulfate; hydrogen, triaqua-µ3-oxotri carbonate; hydrogen, triaqua-µ3-oxotri phosphate; hydrogen, triaqua-µ3-oxotri oxalate; hydrogen, triaqua-µ3-oxotri chromate; hydrogen, triaqua-µ3-oxotri dichromate; hydrogen, triaqua-µ3-oxotri pyrophosphate; and mixtures thereof, wherein the components of the first chemical compound are included at a 1:1 ratio.

11. A chemical formulation comprising:
a chemical composition having the formula:

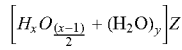

wherein x is an odd integer ≥3;
y is an integer between 1 and 20; and
Z is a polyatomic ion; and
a polar solvent, wherein at least a portion of the chemical composition is present as $H_9O_4+$ in coordinated combination with $H_9O_4+:SO_4H$ and working bridging ligands containing stable hydronium ($H_3O+$) clusters.

12. The chemical formulation of claim 11 wherein x is an integer between 3 and 11 and y is an integer between 1 and 10.

13. The chemical formulation of claim 12 wherein Z is a polyatomic ion selected having a charge of −2 or greater.

14. The chemical formulation of claim 11 wherein the polar solvent s selected from the group consisting of water, short chain alcohols having between one and 4 carbon atoms and mixtures thereof.

15. The chemical composition of claim 11 composed of a stoichiometrically balanced chemical composition of at least one of the following: hydrogen, triaqua-µ3-oxotri sulfate; hydrogen, triaqua-µ3-oxotri carbonate; hydrogen, triaqua-µ3-oxotri phosphate; hydrogen, triaqua-µ3-oxotri oxalate; hydrogen, triaqua-µ3-oxotri chromate; hydrogen, triaqua-µ3-oxotri dichromate; hydrogen, triaqua-µ3-oxotri pyrophosphate; and mixtures thereof, wherein the components are included at a 1:1 ratio.

16. The chemical formulation of claim 11 wherein the chemical composition is present in an about between about 0.05% and 50% by volume.

17. The chemical formulation of claim 11 wherein the chemical composition is present in an amount sufficient to provide an effective pKa of between 0 and 5.

18. The chemical formulation of claim 11 wherein the chemical composition is present in an amount sufficient to provide an effective hydronium ion concentration between about 1 ppm and about 25% by volume.

19. The composition of claim 1 wherein the first compound is present in an amount between 0.5 and 5.0 volume %.

20. The composition of claim 19 wherein the second compound is present in an amount between 30 and 50 volume %.

* * * * *